US011709966B2

(12) United States Patent
Gueta et al.

(10) Patent No.: US 11,709,966 B2
(45) Date of Patent: Jul. 25, 2023

(54) SYSTEM AND METHOD FOR AUTOMATICALLY MASKING CONFIDENTIAL INFORMATION THAT IS INPUT ON A WEBPAGE (71) Applicant: GLASSBOX LTD., Petah Tikva (IL)

(72) Inventors: Yaron Gueta, Hod Hasharon (IL); Roman Goldstain, Tel Aviv (IL); Roi Schragenheim, Kfar Yona (IL)

(73) Assignee: GLASSBOX LTD., Petah Tikva (IL)

( * ) Notice: Subject to any disclaimer, the term of this patent is extended or adjusted under 35 U.S.C. 154(b) by 58 days.

(21) Appl. No.: 17/086,417

(22) Filed: Nov. 1, 2020

(65) Prior Publication Data

US 2021/0173959 A1   Jun. 10, 2021

Related U.S. Application Data (60) Provisional application No. 62/945,167, filed on Dec. 8, 2019.

(51) Int. Cl.
*G06F 21/00* (2013.01)
*G06F 21/62* (2013.01)
*G06F 21/64* (2013.01)
*G06F 16/958* (2019.01)

(52) U.S. Cl.
CPC ........ *G06F 21/6263* (2013.01); *G06F 16/986* (2019.01); *G06F 21/64* (2013.01)

(58) Field of Classification Search
CPC .... G06F 21/6263; G06F 16/986; G06F 21/64; G06F 21/6254; G06F 21/84
See application file for complete search history.

(56) References Cited

U.S. PATENT DOCUMENTS

| 2007/0255704 | A1 | 11/2007 | Baek et al. | |
| 2008/0170693 | A1* | 7/2008 | Spies | H04L 9/0869 380/277 |
| 2008/0208579 | A1 | 8/2008 | Weiss et al. | |
| 2012/0253783 | A1* | 10/2012 | Castelli | G06F 40/51 704/E11.001 |
| 2013/0167192 | A1 | 6/2013 | Hickman et al. | |
| 2013/0305392 | A1* | 11/2013 | Bar-El | H04L 63/0823 726/29 |
| 2015/0363789 | A1 | 12/2015 | Moran et al. | |
| 2017/0083607 | A1* | 3/2017 | Studený | G06F 40/174 |

(Continued)

OTHER PUBLICATIONS

WhosOn PCI PII masking: Credit card numbers typed inside a WhosOn chat session will be masked. Captured on Nov. 25, 2018.

(Continued)

*Primary Examiner* — Ghazal B Shehni (57) ABSTRACT

A method for recording input text that is input in an input field of a webpage, the method comprising: providing the webpage to a client device, by processing circuitry, the webpage comprising: (a) the input field, and (b) instructions executable by web-accessing software for recording the input text; and wherein execution of the instructions results in: identification of masking information in the input text, if any, the masking information being information in the input text to be masked; and if the masking information is identified, masking of the masking information prior to the recording of the input text, so that the masking information is masked when recorded.

17 Claims, 5 Drawing Sheets

(56) References Cited

U.S. PATENT DOCUMENTS

2017/0186127 A1    6/2017  Yu
2017/0337122 A1*  11/2017  Bolajwar ............ G06F 11/3684
2018/0285599 A1   10/2018  Praveen et al.

OTHER PUBLICATIONS

Netwrix Blog Regular Expressions: A regular expression can be defined to determine credit card numbers (see p. 9). Jeff Melnick; Published on May 29, 2018.
SecurityMetrics PANscanTM: Detects if cardholder data is being stored on workstations or servers. Published on Dec. 18, 2016 | Author: Melinda Scott.
Freedom to Tinker (Englehardt): A study analyzing top session replay companies for privacy violations. Several recording services explicitly forbid the collection of user data. See p. 2. There are companies that exclude credit card data. See p. 3.https://freedom-to-ti nker.com/2017 /11 /15/no-boundaries-exfiltration-of-personal-data-by-session-replay-scripts/; Nov. 15, 2017 by Steven Englehardt; Captured on Nov. 28, 2018.
Finding PCI and PII Data with Discovery Attender: Provides various methods to assist in finding and removing PII or PCI information that is found unencrypted in email of file systems. See p. 1. Captured on Nov. 27, 2018.

* cited by examiner

| 404 | Providing a webpage to a client device, the webpage comprising: (a) an input field, and (b) instructions executable by web-accessing software for recording input text that is input in the input field; wherein execution of the instructions results in: analysis of the input text to identify masking information in the input text, if any, the masking information being information in the input text to be masked; and if the masking information is identified, based on the analysis, masking of the masking information prior to the recording of the input text, so that the masking information is masked when recorded |

| 504 | Obtaining a webpage, the webpage comprising: (a) an input field, and (b) instructions executable by web-accessing software of the client device for recording input text that is input in the input field |

| 508 | Executing the instructions by the web-accessing software, wherein, by executing the instructions, the input text that is input by a user of the client device in the input field can be analyzed to identify masking information in the input text, if any, the masking information being information in the input text to be masked; and if the masking information is identified, based on the analysis, the masking information can be masked prior to recording the input text, so that the masking information is masked when recorded |

604 — Providing a webpage to a client device, the webpage comprising: (a) an input field, and (b) instructions executable by web-accessing software for recording input text that is input in the input field; wherein execution of the instructions results in: identification of masking information in the input text, if any, the masking information being information in the input text to be masked, the identification including: determining whether a web element of the input field includes an attribute having an attribute value that is indicative of a presence of the masking information in the input text; if the web element includes the attribute having the attribute value, identifying the masking information; and if the web element does not include the attribute having the attribute value, analyzing the input text to identify the masking information, if any; and if the masking information is identified, masking of the masking information prior to the recording of the input text, so that the masking information is masked when recorded

SYSTEM AND METHOD FOR AUTOMATICALLY MASKING CONFIDENTIAL INFORMATION THAT IS INPUT ON A WEBPAGE

TECHNICAL FIELD

The invention relates to a system and method for automatically masking confidential information that is input on a webpage.

BACKGROUND

Organizations that accept, process and store credit card information are required to comply with the Payment Card Industry Data Security Standard (PCI DSS) to ensure that the credit card information is not obtained by unauthorized parties. Accordingly, organizations that wish to record and play back a user's web session on the organization's website must ensure that credit card information that is input during the web session is masked prior to the recording thereof. It is an object of the present disclosure to enable an organization to automatically mask confidential information, for example credit card information, that is input in any input field on a webpage of the organization, prior to the recording of the confidential information, and without the need for the user to provide an explicit configuration for masking the confidential information.

References considered to be relevant as background to the presently disclosed subject matter are listed below. Acknowledgement of the references herein is not to be inferred as meaning that these are in any way relevant to the patentability of the presently disclosed subject matter.

PCI/PII Masking—WhosOn, available at https://www.whoson.com/explore/pci-pii-masking/?cn-reloaded=1 (captured on Nov. 25, 2018) discloses secure PCI/PII masking to help protect sensitive data shared by customers in a live chat session. This means that any credit card numbers typed inside a WhosOn chat session will be masked, helping a company meet strict PCI DSS security standards. Here's how PCI/PII masking by WhosOn works: From within the WhosOn client, the company can create rules to detect credit card number patterns. WhosOn can then run a pre-storage database procedure against each line of transcript. This allows masking where PII data is detected, or triggered warnings based on the company's settings. During chat transfers, a clean-up procedure can be executed. This will either create a new chat, or mask individual lines.

U.S. Patent Application Publication No. 2017/0186127 (Yu), published on Jun. 29, 2017, discloses a method and an apparatus for capturing a screen on a mobile device, the method including: receiving, at the mobile device, a screen-capturing request for a current interface, where the current interface includes first data, and the first data includes personal information; and generating, according to screen-capturing request, a screen capture image for the current interface, where the first data in the current interface is replaced in the screen capture image with second data which is predefined. This avoids the need to manually mask an image by starting a dedicated image editing tool to anonymize a screen capture image, thereby significantly lowering the relatively high technical threshold of anonymization processing, reducing the error rate, and improving the modification quality of anonymization. Moreover, the replacement is directly made to the image while the screen is captured without interfering with normal use of reading.

U.S. Patent Application Publication No. 2015/0363789 (Moran et al.), published on Dec. 17, 2015, discloses a system for providing Payment Card Industry (PCI) compliance for a contact center. The system includes a monitoring module configured to monitor a communication session between an agent and a customer. At least one image associated with the agent's computer screen is captured during the communication session. An analysis module is configured to compare the at least one image with at least one predefined image. A control module is configured to control a recording of information associated with the communication session based on the comparison.

Steven Englehardt, "No Boundaries: Exfiltration of Personal Data by Session-Replay Scripts", available at https://freedom-to-tinker.com/2017/11/15/no-boundaries-exfiltration-of-personal-data-by-session-replay-scripts (captured on Nov. 28, 2018), discusses the use of "session replay" scripts by more and more websites, these "session replay" scripts recording keystrokes, mouse movements, and scrolling behavior, along with the entire contents of the pages visited during a web session, and sending them to third-party servers. Unlike typical analytics services that provide aggregate statistics, these scripts are intended for the recording and playback of individual browsing sessions.

U.S. Patent Application Publication No. 2008/0208579 (Weiss et al.), published on Aug. 28, 2008, discloses a computer-implemented method for session processing including identifying a type of data item that is presented to a user by a computerized system. A session in which the user interacts with the computerized system is recorded. A data item of the identified type is automatically detected in the recorded session. The recorded session is replayed, while refraining from presenting the detected data item in the replayed session.

U.S. Patent Application Publication No. 2018/0285599 (Praveen et al.), published on Oct. 4, 2018, describes methods, systems and computer program products for layered masking of data. A system receives content including personally identifiable information (PII). The system redacts the content by masking the PII. The system identifies the PII in multi-layer processing, where in each layer, the system determines a respective confidence score indicating a probability that a token is PII. If the confidence score is sufficiently high, the system masks the token. Otherwise, the system provides the token to a next layer for processing. The layers can include regular expression based processing, lookup table based processing, and machine learning based processing.

General Description

In accordance with a first aspect of the presently disclosed subject matter, there is provided a method for recording input text that is input in an input field of a webpage, the method comprising: providing the webpage to a client device, by processing circuitry, the webpage comprising: (a) the input field, and (b) instructions executable by web-accessing software for recording the input text; wherein execution of the instructions results in: analysis of the input text to identify masking information in the input text, if any, the masking information being information in the input text to be masked; and if the masking information is identified, based on the analysis, masking of the masking information prior to the recording of the input text, so that the masking information is masked when recorded.

In some cases, the masking information includes part or all of a confidential number, being one or more of the following: a credit card number or a personal identification number.

In some cases, the confidential number is validatable by a Luhn algorithm.

In some cases, the analysis includes: determining whether the input text includes at least one instance of numeric text consisting of, with the exception of whitespace characters, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the analysis includes: determining whether the input text includes at least one instance of numeric text consisting of, with the exception of whitespace characters, if any, and hyphens, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the checksum formula is a Luhn algorithm.

In some cases, the confidential number is the credit card number; and the range of the possible number of numeric characters in the credit card number is between twelve and nineteen, inclusive.

In accordance with a second aspect of the presently disclosed subject matter, there is provided a method for recording input text that is input in an input field of a webpage, the method comprising: providing the webpage to a client device, by processing circuitry, the webpage comprising: (a) the input field, and (b) instructions executable by web-accessing software for recording the input text; and wherein execution of the instructions results in: identification of masking information in the input text, if any, the masking information being information in the input text to be masked, the identification including: determining whether a web element of the input field includes an attribute having an attribute value that is indicative of a presence of the masking information in the input text; if the web element includes the attribute having the attribute value, identifying the masking information; and if the web element does not include the attribute having the attribute value, analyzing the input text to identify the masking information, if any; and if the masking information is identified, masking of the masking information prior to the recording of the input text, so that the masking information is masked when recorded.

In some cases, the attribute is a standard Document Object Model (DOM) attribute for version 5 of the Hypertext Markup Language (HTML5).

In some cases, the masking information includes part or all of a confidential number, being one or more of the following: a credit card number or a personal identification number.

In some cases, the confidential number is validatable by a Luhn algorithm.

In some cases, the analyzing includes: determining whether the input text includes at least one instance of numeric text consisting of, with the exception of whitespace characters, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the analyzing includes: determining whether the input text includes at least one instance of numeric text consisting of, with the exception of whitespace characters, if any, and hyphens, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the checksum formula is a Luhn algorithm.

In some cases, the confidential number is the credit card number; and the range of the possible number of numeric characters in the credit card number is between twelve and nineteen, inclusive.

In accordance with a third aspect of the presently disclosed subject matter, there is provided a system for recording input text that is input in an input field of a webpage, the system including processing circuitry configured to: provide the webpage to a client device, the webpage comprising: (a) the input field, and (b) instructions executable by web-accessing software for recording the input text; wherein execution of the instructions results in: analysis of the input text to identify masking information in the input text, if any, the masking information being information in the input text to be masked; and if the masking information is identified, based on the analysis, masking of the masking information prior to the recording of the input text, so that the masking information is masked when recorded.

In some cases, the masking information includes part or all of a confidential number, being one or more of the following: a credit card number or a personal identification number.

In some cases, the confidential number is validatable by a Luhn algorithm.

In some cases, the analysis includes: determining whether the input text includes at least one instance of numeric text consisting of, with the exception of whitespace characters, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the analysis includes: determining whether the input text includes at least one instance of numeric text consisting of, with the exception of whitespace characters, if any, and hyphens, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the checksum formula is a Luhn algorithm.

In some cases, the confidential number is the credit card number; and the range of the possible number of numeric characters in the credit card number is between twelve and nineteen, inclusive.

In accordance with a fourth aspect of the presently disclosed subject matter, there is provided a system for recording input text that is input in an input field of a webpage, the system including processing circuitry configured to: provide the webpage to a client device, the webpage comprising: (a) the input field, and (b) instructions executable by web-accessing software for recording the input text; and wherein execution of the instructions results in: identification of masking information in the input text, if any, the masking information being information in the input text to be masked, the identification including: determining whether a web element of the input field includes an attribute having an attribute value that is indicative of a presence of the masking information in the input text; if the web element includes the attribute having the attribute value, identifying the masking information; and if the web element does not include the attribute having the attribute value, analyzing the input text to identify the masking information, if any; and if the masking information is identified, masking of the masking information prior to the recording of the input text, so that the masking information is masked when recorded.

In some cases, the attribute is a standard Document Object Model (DOM) attribute for version 5 of the Hypertext Markup Language (HTML5).

In some cases, the masking information includes part or all of a confidential number, being one or more of the following: a credit card number or a personal identification number.

In some cases, the confidential number is validatable by a Luhn algorithm.

In some cases, the analyzing includes: determining whether the input text includes at least one instance of numeric text consisting of, with the exception of whitespace characters, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the analyzing includes: determining whether the input text includes at least one instance of numeric text consisting of, with the exception of whitespace characters, if any, and hyphens, if any, a first number of numeric characters; if the input text includes the at least one instance of numeric text, determining whether the first number of numeric characters is identical to a second number of numeric characters in the confidential number or is within a range of a possible number of numeric characters in the confidential number; if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

In some cases, the checksum formula is a Luhn algorithm.

In some cases, the confidential number is the credit card number; and the range of the possible number of numeric characters in the credit card number is between twelve and nineteen, inclusive.

In accordance with a fifth aspect of the presently disclosed subject matter, there is provided a non-transitory computer readable storage medium having computer readable program code embodied therewith, the computer readable program code, executable by processing circuitry of a computer to perform a method for recording input text that is input in an input field of a webpage, the method comprising: providing the webpage to a client device, the webpage comprising: (a) the input field, and (b) instructions executable by web-accessing software for recording the input text; wherein execution of the instructions results in: analysis of the input text to identify masking information in the input text, if any, the masking information being information in the input text to be masked; and if the masking information is identified, based on the analysis, masking of the masking information prior to the recording of the input text, so that the masking information is masked when recorded.

In accordance with a sixth aspect of the presently disclosed subject matter, there is provided a non-transitory computer readable storage medium having computer readable program code embodied therewith, the computer readable program code, executable by processing circuitry of a computer to perform a method for recording input text that is input in an input field of a webpage, the method comprising: providing the webpage to a client device, the webpage comprising: (a) the input field, and (b) instructions executable by web-accessing software for recording the input text; and wherein execution of the instructions results in: identification of masking information in the input text, if any, the masking information being information in the input text to be masked, the identification including: determining whether a web element of the input field includes an attribute having an attribute value that is indicative of a presence of the masking information in the input text; if the web element includes the attribute having the attribute value, identifying the masking information; and if the web element does not include the attribute having the attribute value, analyzing the input text to identify the masking information, if any; and if the masking information is identified, masking of the masking information prior to the recording of the input text, so that the masking information is masked when recorded.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "recording", "analyzing", "identifying", "masking", "determining", "applying" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
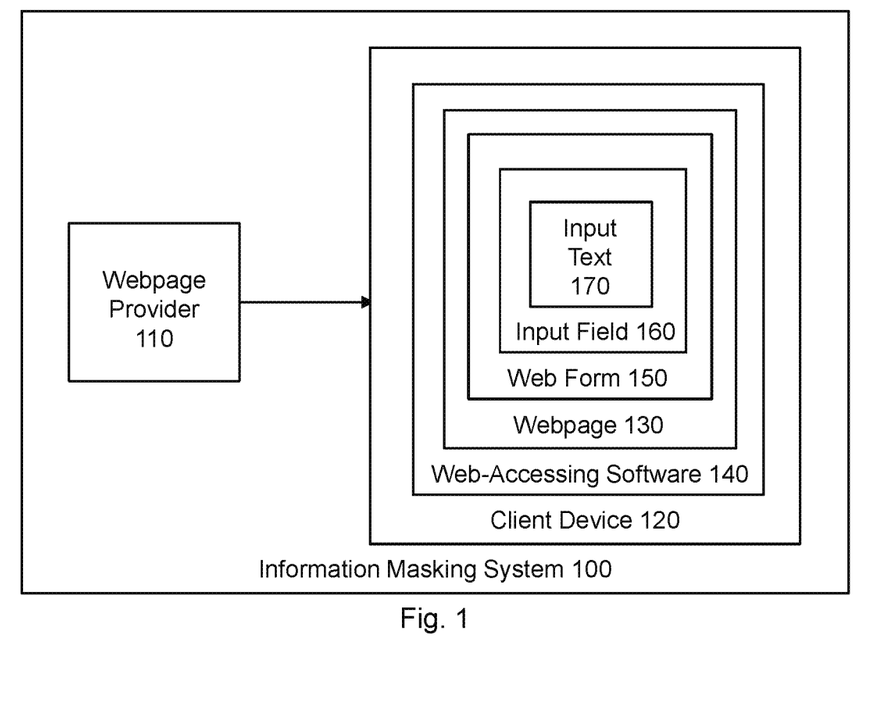
FIG. 1 is a block diagram schematically illustrating one example of an information masking system, in accordance with the presently disclosed subject matter.
Figure 2:
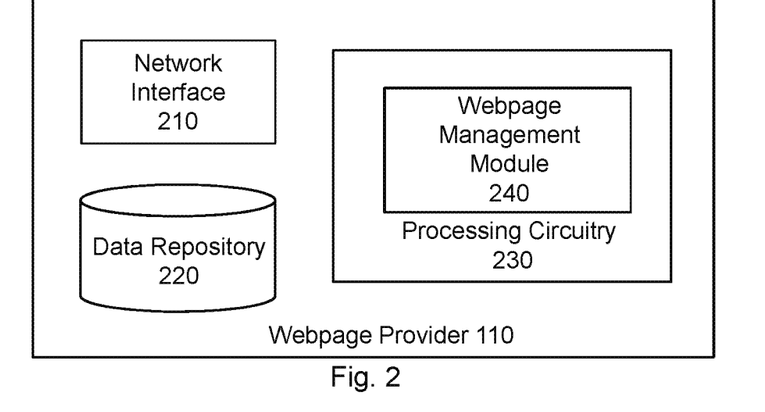
FIG. 2 is a block diagram schematically illustrating one example of a webpage provider of the information masking system, in accordance with the presently disclosed subject matter.
Figure 3:
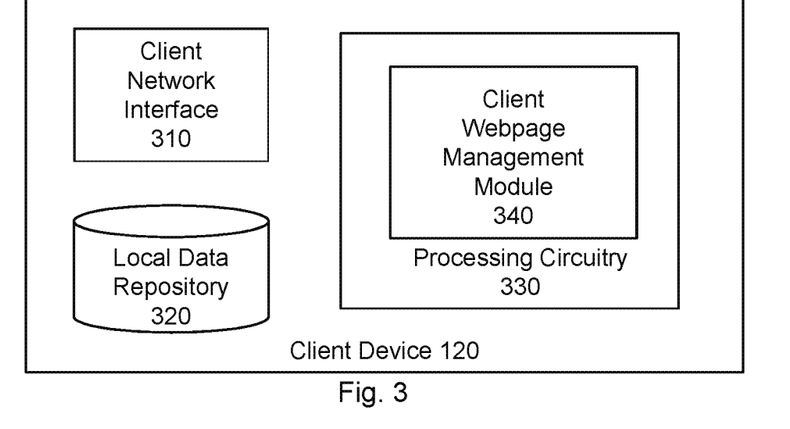
FIG. 3 is a block diagram schematically illustrating one example of a client device of the information masking system, in accordance with the presently disclosed subject matter.

In embodiments of the presently disclosed subject matter, fewer, more and/or different stages than those shown in FIGS. 4-7 may be executed. In embodiments of the presently disclosed subject matter, one or more stages illustrated in FIGS. 4-7 may be executed in a different order and/or one or more groups of stages may be executed simultaneously. FIGS. 1-3 illustrate a general schematic of the system architecture in accordance with embodiments of the presently disclosed subject matter. Each module in FIGS. 1-3 can be made up of any combination of software, hardware and/or firmware that performs the functions as defined and explained herein. The modules in FIGS. 1-3 may be centralized in one location or dispersed over more than one location. In other embodiments of the presently disclosed subject matter, the system may comprise fewer, more, and/or different modules than those shown in FIGS. 1-3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of an information masking system 100, in accordance with the presently disclosed subject matter.

In accordance with the presently disclosed subject matter, information masking system 100 can include webpage provider 110 and client device 120.

Webpage provider 110 can be a web server that is configured to provide a webpage 130 to client device 120, thereby enabling at least one user of client device 120 to interact with the webpage 130. The user can interact with the webpage 130 using web-accessing software 140 that is installed on client device 120 and that displays the webpage 130 on client device 120. In some cases, web-accessing software 140 can be a web browser (i.e. a wide purpose application used for browsing websites in order for a user of client device 120 to view webpages), a web based application (i.e. a dedicated application used to browse specific webpages) or similar applications used to view webpages during a web browsing session.

In some cases, the webpage 130 can comprise a web form 150. The webpage 130 (e.g., the web form 150) can include an input field 160 in which input text 170 can be input by a user of client device 120.

The webpage 130 can further comprise instructions executable by the web-accessing software 140 for recording the input text 170 that is input by the user of client device 120 in input field 160. The recording of the input text 170 can be part of a recording of a web browsing session between the user of client device 120 and a website that includes the webpage 130. In some cases, the recording of the web browsing session can be performed by webpage provider 110. In other cases, the recording of the web browsing session can be performed by a web-session recording unit (not shown) that is different than webpage provider 110. In some cases, webpage provider 110 can be configured to provide the webpage 130 to client device 120 via the web-session recording unit or via any other proxy device.

Client device 120 can be a computation device (e.g. a desktop computer, a laptop, a smartphone, a tablet, etc.) on which web-accessing software 140 is installed. Web-accessing software 140 can be configured to execute the instructions that are comprised within the webpage 130 for recording input text 170 that is input in input field 160 of the webpage 130. As detailed further herein, inter alia with reference to FIGS. 4 to 7, execution of the instructions that are comprised within the webpage 130 by web-accessing software 140 can result in the identification of masking information in the input text 170, if any, the masking information being information in the input text to be masked, and the masking of the masking information prior to the recording of the input text 170.

Attention is now drawn to FIG. 2, a block diagram schematically illustrating one example of a webpage provider 110 of an information masking system 100, in accordance with the presently disclosed subject matter.

In accordance with the presently disclosed subject matter, webpage provider 110 can comprise a network interface 210 (e.g. a network card, a WiFi client, a LiFi client, 3G/4G client, or any other component), enabling webpage provider 110 to communicate over a network with one or more client devices (e.g., client device 120), web-session recording units, etc.

Webpage provider 110 can further comprise, or be otherwise associated with, a data repository 220 (e.g. a database, a storage system, a memory including Read Only Memory—ROM, Random Access Memory—RAM, or any other type of memory, etc.) configured to store data, including, inter alia, webpages, web browsing sessions, etc.

Webpage provider 110 further comprises processing circuitry 230. Processing circuitry 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of webpage provider 110 and for enabling operations related to system resources of webpage provider 110.

Processing circuitry 230 can be configured to include a webpage management module 240. Webpage management module 240 can be configured to provide one or more webpages to one or more client devices, including webpage 130 to client device 120. In some cases, webpage 130 can comprise a web form 150. Webpage 130 can include: (a) an input field 160 (e.g., within a web form 150), and (b) instructions executable by web-accessing software 140 for recording input text 170 that is input in the input field 160, as detailed further herein, inter alia with reference to FIGS. 4 and 6. In some cases, webpage management module 240 can be configured to provide the webpage 130 to client device 120 via a web-session recording unit that is configured to a record a web browsing session between the at least one user of client device 120 and a website that includes the webpage 130.

In some cases, webpage management module 240 can be further configured to record a web browsing session between the at least one user of client device 120 and a website that includes the webpage 130.

Attention is now drawn to FIG. 3, a block diagram schematically illustrating one example of a client device 120 of information masking system 100, in accordance with the presently disclosed subject matter.

In accordance with the presently disclosed subject matter, client device 120 can comprise a client network interface 310 (e.g. a network card, a WiFi client, a LiFi client, 3G/4G client, or any other component), enabling client device 120 to communicate over a network with one or more webpage providers (e.g., webpage provider 110), web-session recording units, etc.

Client device 120 can further comprise, or be otherwise associated with, a local data repository 320 (e.g. a database, a storage system, a memory including Read Only Memory—ROM, Random Access Memory—RAM, or any other type of memory, etc.) configured to store data, including, inter alia, webpage 130.

Client device 120 further comprises processing circuitry 330. Processing circuitry 330 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of client device 120 and for enabling operations related to system resources of client device 120.

Processing circuitry 330 can be configured to include a client webpage management module 340. Client webpage management module 340 can be configured to obtain a webpage 130. In some cases, the webpage 130 can comprise a web form 150. Webpage 130 can include: (a) an input field 160 (e.g., within a web form 150), and (b) instructions executable by web-accessing software 140 of client device 120 for recording input text 170 that is input in the input field 160. Client webpage management module 340 can be further configured to execute the instructions that are comprised within the webpage 130, as detailed further herein, inter alia with reference to FIGS. 5 and 7.

In some cases, client webpage management module 340 can be configured to obtain the webpage 130 from webpage provider 110 via a web-session recording unit that is configured to record a web browsing session between the at least one user of client device 120 and a website that includes the webpage 130.

Figure 4:
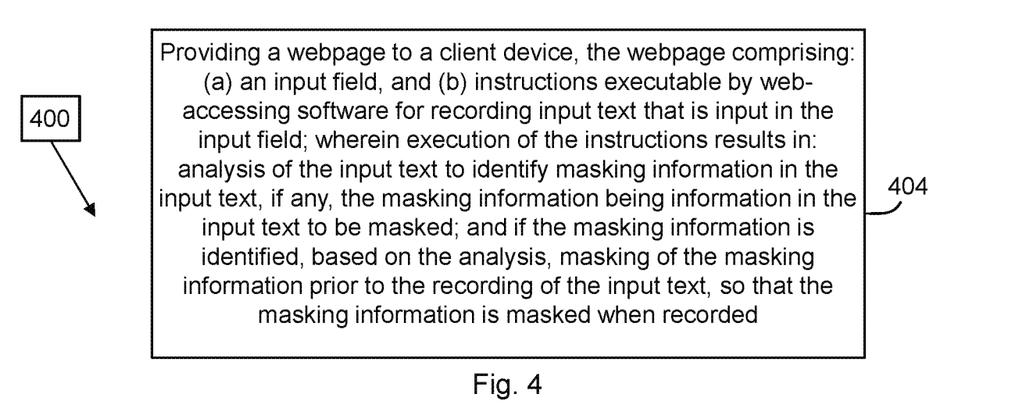
FIG. 4 is a flowchart illustrating a first example of a sequence of operations carried out by a webpage provider, in accordance with the presently disclosed subject matter.

Attention is now drawn to FIG. 4, a flowchart illustrating a first example of a sequence of operations carried out by a webpage provider 110, in accordance with the presently disclosed subject matter.

In accordance with the presently disclosed subject matter, webpage provider 110 can be configured to perform a webpage management process 400, e.g. using webpage management module 240.

For this purpose, webpage provider 110 can be configured to provide a webpage 130 to a client device 120, the webpage 130 comprising: (a) an input field 160 (e.g., within a web form 150), and (b) instructions executable by web-accessing software 140 for recording input text 170 that is input in the input field 160, wherein execution of the instructions results in: analysis of the input text 170 to identify masking information in the input text 170, if any, the masking information being information in the input text 170 to be masked; and if the masking information is identified, based on the analysis, masking of the masking information prior to the recording of the input text 170, so that the masking information is masked when recorded (block 404). For example, if a user of the client device 120 inputs masking information in an input field 160 that is not designated by the webpage 130 for obtaining the masking information, the masking information can still be identified by analyzing the input text 170.

In some cases, if the masking information is identified in the input text 170, execution of the instructions can further result in the automatic masking of text that is input in any of the input fields contained within a parent HTML element (the webpage 130, web form 150, web sub-form, etc.) that includes the input field 160 in which the input text 170 was input, absent an explicit configuration provided by a user of the client device 120 not to automatically mask the text that is input in certain input fields contained within the parent HTML element.

In some cases, the masking information can include part or all of a confidential number, being one or more of the following: a credit card number or a personal identification number. The instructions included within the webpage 130 can indicate the digits of the confidential number that should remain unmasked, if any.

In some cases, the confidential number can be validatable by a Luhn algorithm. It is to be noted, in this regard, that credit card numbers are generally validatable by a Luhn algorithm.

In some cases, input text 170 can be analyzed to identify a confidential number in the input text 170 by: (a) determining whether the input text 170 includes at least one instance of numeric text consisting of, with the exception of whitespace characters, if any, a first number of numeric characters; (b) if the input text 170 includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

In some cases, input text 170 can be analyzed to identify a confidential number in the input text 170 by: (a) determining whether the input text 170 includes at least one instance of numeric text consisting of, with the exception of whitespace characters, if any, and hyphens, if any, a first number of numeric characters; (b) if the input text 170 includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

It is to be noted that, with reference to FIG. 4, the block can be broken down to a few blocks and/or other blocks may be added. It is also noted that whilst the flow diagram is described with reference to a system element, this is by no means binding, and the block can be performed by other system element(s).

Figure 5:
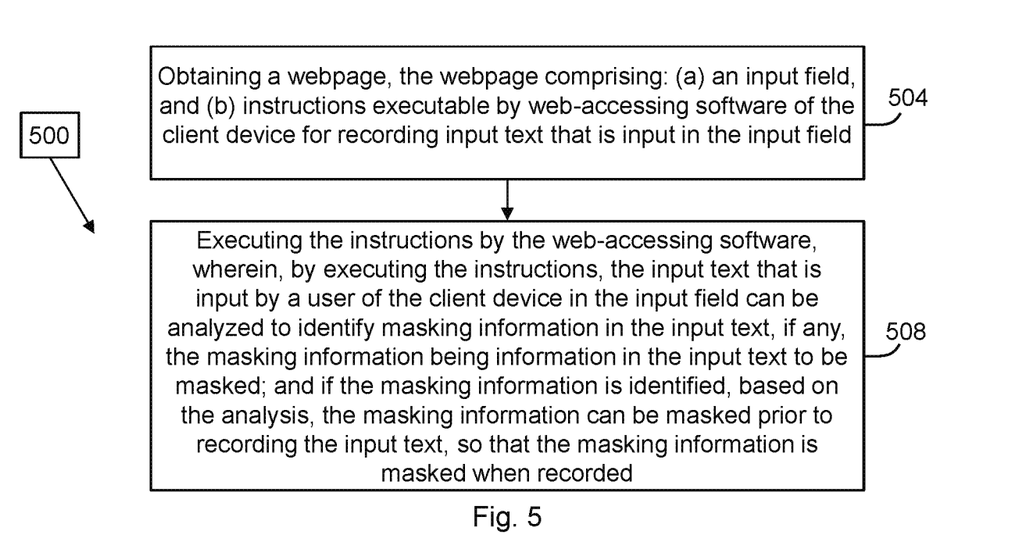
FIG. 5 is a flowchart illustrating a first example of a sequence of operations carried out by a client device, in accordance with the presently disclosed subject matter.

Attention is now drawn to FIG. 5, a flowchart illustrating a first example of a sequence of operations carried out by a client device 120, in accordance with the presently disclosed subject matter.

In accordance with the presently disclosed subject matter, client device 120 can be configured to perform a client webpage management process 500, e.g. using client webpage management module 340.

For this purpose, client device 120 can be configured to obtain a webpage 130, the webpage 130 comprising: (a) an input field 160 (e.g., within a web form 150), and (b) instructions executable by web-accessing software 140 of the client device 120 for recording input text 170 that is input in the input field 160 (block 504).

Client device 120 can be further configured to execute the instructions by the web-accessing software 140, wherein, by executing the instructions, the input text 170 that is input by a user of the client device 120 in the input field 160 can be analyzed to identify masking information in the input text 170, if any, the masking information being information in the input text 170 to be masked; and if the masking information is identified, based on the analysis, the masking information can be masked prior to recording the input text 170, so that the masking information is masked when recorded (block 508). For example, if a user of the client device 120 inputs masking information in an input field 160 that is not designated by the webpage 130 for obtaining the masking information, the masking information can still be identified by analyzing the input text 170.

In some cases, if the masking information is identified in the input text 170, execution of the instructions by the client device 120 can automatically mask text that is input in any of the input fields contained within a parent HTML element (the webpage 130, web form 150, web sub-form, etc.) that includes the input field 160 in which the input text 170 was input, absent an explicit configuration provided by a user of the client device 120 not to automatically mask the text that is input in certain input fields contained within the parent HTML element.

In some cases, the masking information can include part or all of a confidential number, being one or more of the following: a credit card number or a personal identification number. The instructions included within the webpage 130 can indicate the digits of the confidential number that should remain unmasked, if any.

In some cases, the confidential number can be validatable by a Luhn algorithm. It is to be noted, in this regard, that credit card numbers are generally validatable by a Luhn algorithm.

In some cases, input text 170 can be analyzed to identify a confidential number in the input text 170 by: (a) determining whether the input text 170 includes at least one instance of numeric text consisting of, with the exception of whitespace characters, if any, a first number of numeric characters; (b) if the input text 170 includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

In some cases, input text 170 can be analyzed to identify a confidential number in the input text 170 by: (a) determining whether the input text 170 includes at least one instance of numeric text consisting of, with the exception of whitespace characters, if any, and hyphens, if any, a first number of numeric characters; (b) if the input text 170 includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

It is to be noted that, with reference to FIG. 5, some of the blocks can be integrated into a consolidated block or can be broken down to a few blocks and/or other blocks may be added. It is also noted that whilst the flow diagram is described with reference to the system elements that realize them, this is by no means binding, and the blocks can be performed by elements other than those described herein.

Figure 6:
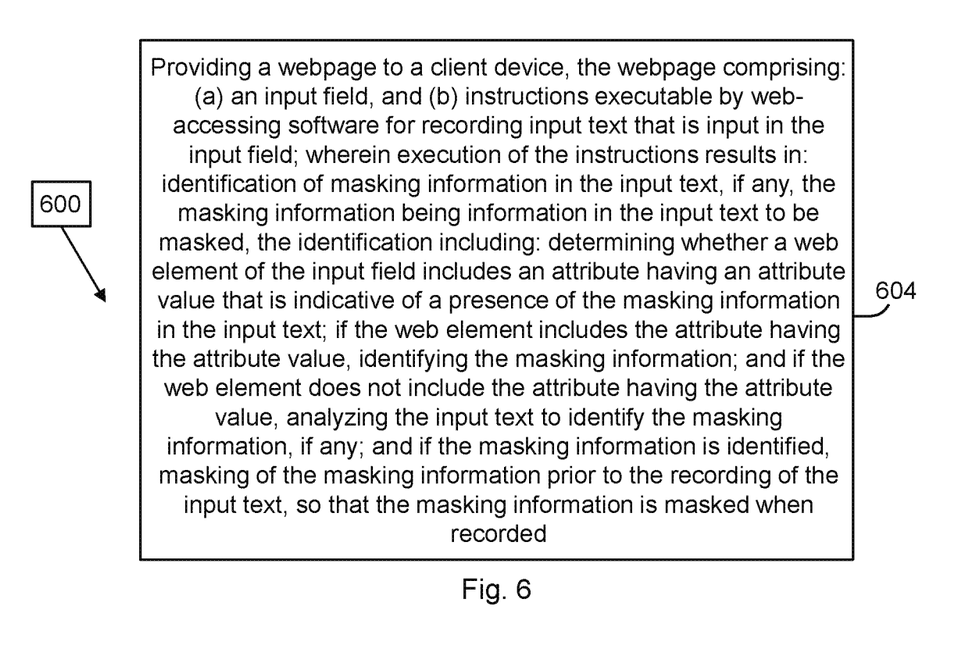
FIG. 6 is a flowchart illustrating a second example of a sequence of operations carried out by a webpage provider, in accordance with the presently disclosed subject matter.

Attention is now drawn to FIG. 6, a second example of a sequence of operations carried out by a webpage provider 110, in accordance with the presently disclosed subject matter.

In accordance with the presently disclosed subject matter, webpage provider 110 can be configured to perform a webpage management process 600, e.g. using webpage management module 240.

For this purpose, webpage provider 110 can be configured to provide a webpage 130 to client device 120, the webpage 130 comprising: (a) an input field 160 (e.g., within a web form 150) and (b) instructions executable by web-accessing software 140 for recording input text 170 that is input in the input field 160; wherein execution of the instructions results in: (a) identification of masking information in the input text 170, if any, the masking information being information in the input text 170 to be masked; and (b) if the masking information is identified, masking of the masking information prior to the recording of the input text 170, so that the masking information is masked when recorded. Identification of the masking information in the input text 170, if any, can include: (1) determining whether a web element of the input field 160 includes an attribute having an attribute value that is indicative of a presence of the masking information in the input text 170; (2) if the web element includes the attribute having the attribute value, identifying the masking information; and (3) if the web element does not include the attribute having the attribute value, analyzing the input text 170 to identify the masking information, if any (block 604).

In some cases, the attribute of the web element of the input field 160 can be a standard Document Object Model (DOM) attribute for version 5 of the Hypertext Markup Language (HTML5). In some cases, the standard DOM attribute of the web element can be one of the following attributes: autocomplete or x-autocompletetype. In some cases, the attribute values that are indicative of a presence of masking information in the input text 170 are attribute values that indicate that the input field 160 is designated to obtain (i.e., have input therein) a credit card number or a credit card security number ("CVC").

In some cases, if the masking information is identified in the input text 170, execution of the instructions can further result in the automatic masking of text that is input in any of the input fields contained within a parent HTML element (the webpage 130, web form 150, web sub-form, etc.) that includes the input field 160 in which the input text 170 was input, absent an explicit configuration provided by a user of the client device 120 not to automatically mask the text that is input in certain input fields contained within the parent HTML element.

In some cases, the masking information can include part or all of a confidential number, being one or more of the following: a credit card number or a personal identification number. The instructions included within the webpage 130 can indicate the digits of the confidential number that should remain unmasked, if any.

In some cases, the confidential number can be validatable by a Luhn algorithm. It is to be noted, in this regard, that credit card numbers are generally validatable by a Luhn algorithm.

In some cases, input text 170 can be analyzed to identify a confidential number in the input text 170 by: (a) determining whether the input text 170 includes at least one instance of numeric text consisting of, with the exception of whitespace characters, if any, a first number of numeric characters; (b) if the input text 170 includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

In some cases, input text 170 can be analyzed to identify a confidential number in the input text 170 by: (a) determining whether the input text 170 includes at least one instance of numeric text consisting of, with the exception of whitespace characters, if any, and hyphens, if any, a first number of numeric characters; (b) if the input text includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

It is to be noted that, with reference to FIG. 6, the block can be broken down to a few blocks and/or other blocks may be added. It is also noted that whilst the flow diagram is described with reference to a system element, this is by no means binding, and the block can be performed by other system element(s).

Figure 7:
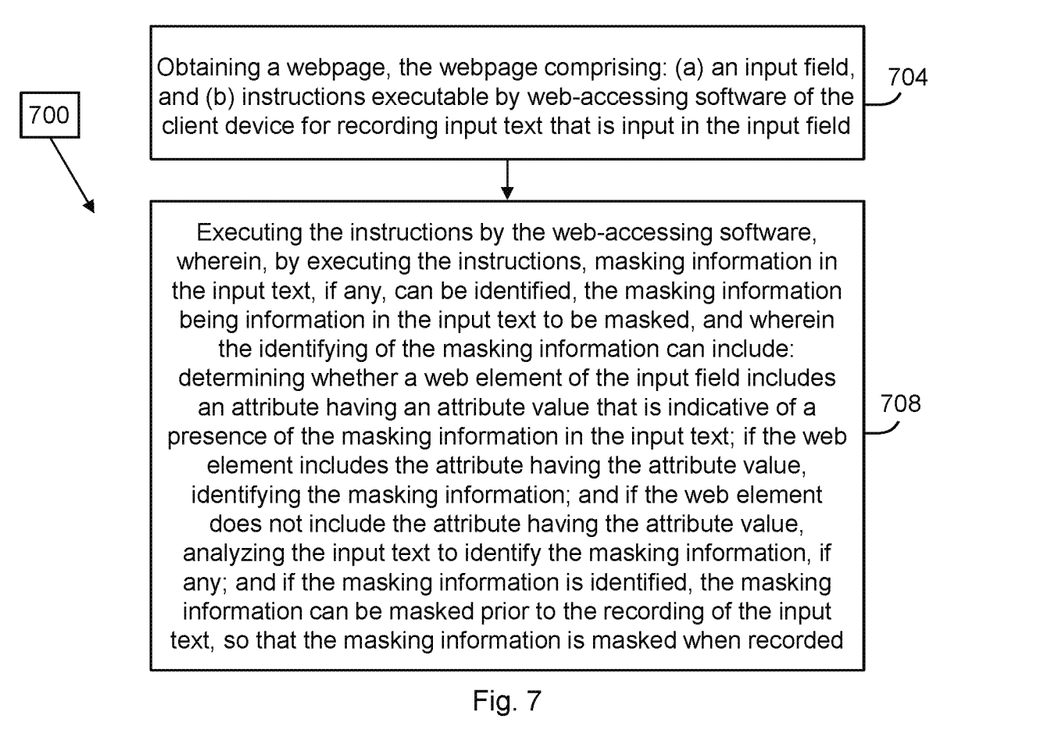
FIG. 7 is a flowchart illustrating a second example of a sequence of operations carried out by a client device, in accordance with the presently disclosed subject matter.

Attention is now drawn to FIG. 7, a flowchart illustrating a second example of a sequence of operations carried out by a client device 120, in accordance with the presently disclosed subject matter.

In accordance with the presently disclosed subject matter, client device 120 can be configured to perform a client webpage management process 700, e.g. using client webpage management module 340.

For this purpose, client device 120 can be configured to obtain a webpage 130, the webpage 130 comprising: (a) an input field 160 (e.g., within a web form 150), and (b) instructions executable by web-accessing software 140 of the client device 120 for recording input text 170 that is input in the input field 160 (block 704).

Client device 120 can be further configured to execute the instructions by the web-accessing software 140, wherein, by executing the instructions, masking information in the input text 170, if any, can be identified, the masking information being information in the input text 170 to be masked; and if the masking information is identified, the masking information can be masked prior to recording the input text 170, so that the masking information is masked when recorded. The masking information in the input text 170, if any, can be identified by: (1) determining whether a web element of the input field 160 includes an attribute having an attribute value that is indicative of a presence of the masking information in the input text 170; (2) if the web element includes the attribute having the attribute value, identifying the masking information; and (c) if the web element does not include the attribute having the attribute value, analyzing the input text 170 to identify the masking information, if any (block 708).

In some cases, the attribute of the web element of the input field 160 can be a standard Document Object Model (DOM) attribute for version 5 of the Hypertext Markup Language (HTML5). In some cases, the standard DOM attribute of the web element can be one of the following attributes: autocomplete or x-autocompletetype. In some cases, the attribute values that are indicative of a presence of masking information in the input text 170 are attribute values that indicate that the input field 160 is designated to obtain (i.e., have input therein) a credit card number or a credit card security number ("CVC"). In some cases, if the masking information is identified in the input text 170, execution of the instructions by the client device 120 can automatically mask text that is input in any of the input fields contained within a parent HTML element (the webpage 130, web form 150, web sub-form, etc.) that includes the input field 160 in which the input text 170 was input, absent an explicit configuration provided by a user of the client device 120 not to automatically mask the text that is input in certain input fields contained within the parent HTML element.

In some cases, the masking information can include part or all of a confidential number, being one or more of the following: a credit card number or a personal identification number. The instructions included within the webpage 130 can indicate the digits of the confidential number that should remain unmasked, if any.

In some cases, the confidential number can be validatable by a Luhn algorithm. It is to be noted, in this regard, that credit card numbers are generally validatable by a Luhn algorithm.

In some cases, input text 170 can be analyzed to identify a confidential number in the input text 170 by: (a) determining whether the input text 170 includes at least one instance of numeric text consisting of, with the exception of whitespace characters, if any, a first number of numeric characters; (b) if the input text 170 includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

In some cases, input text 170 can be analyzed to identify a confidential number in the input text 170 by: (a) determining whether the input text 170 includes at least one instance of numeric text consisting of, with the exception of whitespace characters, if any, and hyphens, if any, a first number of numeric characters; (b) if the input text includes the at least one instance of numeric text, determining whether the first number of numeric characters is identical to a second number of numeric characters in the confidential number or is within a range of a possible number of numeric characters in the confidential number; (c) if the first number of numeric characters is identical to the second number of numeric characters or is within the range of the possible number of numeric characters, applying a checksum formula to a numeric value formed by the first number of numeric characters; and (d) if the checksum formula applied to the numeric value returns a positive result, determining that the at least one instance of numeric text includes the confidential number.

In some cases, the checksum formula that is applied to the numeric value formed by the first number of numeric characters can be a Luhn algorithm.

In some cases, the confidential number can be a credit card number, and the range of the possible number of numeric characters in the credit card number can be between twelve and nineteen, inclusive.

It is to be noted that, with reference to FIG. 7, some of the blocks can be integrated into a consolidated block or can be broken down to a few blocks and/or other blocks may be added. It is also noted that whilst the flow diagram is described with reference to the system elements that realize them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method for recording input text that has been input, by a user of a client device, in an input field of a webpage, the method comprising:
providing the webpage to the client device, by processing circuitry of a webpage provider, the webpage provider being distinct from the client device, the webpage comprising: (a) the input field, and (b) instructions executable by web-accessing software for performing, by a web session recording unit, distinct from the client device, or the webpage provider, a recording of a web browsing session between the user and a website that includes the webpage, the recording of the web browsing session including recording the input text; and
wherein execution of the instructions results in:
identification of masking information in the input text, if any, by the client device, the masking information being information in the input text that is to be masked by the client device prior to the recording of the input text, the identification including:
determining whether a web element of the input field includes an attribute having an attribute value that is indicative of a presence of the masking information in the input text;
if the web element includes the attribute having the attribute value, identifying the masking information; and
if the web element does not include the attribute having the attribute value, analyzing the input text to identify the masking information, if any; and
if the masking information is identified, masking of the masking information, by the client device, prior to the recording of the input text, so that the masking information is masked in the recording of the web browsing session.

2. The method of claim 1, wherein the attribute is a standard Document Object Model (DOM) attribute for version 5 of the Hypertext Markup Language (HTML5).

3. The method of claim 1, wherein the masking information includes part or all of a confidential number, being one or more of the following: a credit card number or a personal identification number.

4. The method of claim 3, wherein the confidential number is validatable by a Luhn algorithm.

5. The method of claim 3, wherein the analyzing includes:
determining whether the input text includes at least one instance of numeric text consisting of, with the exception of whitespace characters, if any, a first number of numeric characters;

if the input text includes the at least one instance of numeric text, determining whether the first number of numeric characters is identical to a second number of numeric characters in the confidential number or is within a range of a possible number of numeric characters in the confidential number;

if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

6. The method of claim 5, wherein the checksum formula is a Luhn algorithm.

7. The method of claim 5, wherein the confidential number is the credit card number; and
wherein the range of the possible number of numeric characters in the credit card number is between twelve and nineteen, inclusive.

8. The method of claim 3, wherein the analyzing includes:
determining whether the input text includes at least one instance of numeric text consisting of, with the exception of whitespace characters, if any, and hyphens, if any, a first number of numeric characters;
if the input text includes the at least one instance of numeric text, determining whether the first number of numeric characters is identical to a second number of numeric characters in the confidential number or is within a range of a possible number of numeric characters in the confidential number;
if the first number of numeric characters is identical to the second number of numeric characters or is within the range of the possible number of numeric characters, applying a checksum formula to a numeric value formed by the first number of numeric characters; and
if the checksum formula applied to the numeric value returns a positive result, determining that the at least one instance of numeric text includes the confidential number.

9. A system for recording input text that has been input, by a user of a client device, in an input field of a webpage, the system being comprised of processing circuitry of a webpage provider that is distinct from the client device, the processing circuitry being configured to:
provide the webpage to the client device, the webpage comprising: (a) the input field, and (b) instructions executable by web-accessing software for performing, by a web session recording unit, distinct from the client device, or the webpage provider, a recording of a web browsing session between the user and a website that includes the webpage, the recording of the web browsing session including recording the input text; and
wherein execution of the instructions results in:
identification of masking information in the input text, if any, by the client device, the masking information being information in the input text that is to be masked by the client device prior to the recording of the input text, the identification including:
determining whether a web element of the input field includes an attribute having an attribute value that is indicative of a presence of the masking information in the input text;
if the web element includes the attribute having the attribute value, identifying the masking information; and
if the web element does not include the attribute having the attribute value, analyzing the input text to identify the masking information, if any; and
if the masking information is identified, masking of the masking information, by the client device, prior to the recording of the input text, so that the masking information is masked in the recording of the web browsing session.

10. The system of claim 9, wherein the attribute is a standard Document Object Model (DOM) attribute for version 5 of the Hypertext Markup Language (HTML5).

11. The system of claim 9, wherein the masking information includes part or all of a confidential number, being one or more of the following: a credit card number or a personal identification number.

12. The system of claim 11, wherein the confidential number is validatable by a Luhn algorithm.

13. The system of claim 11, wherein the analyzing includes:
determining whether the input text includes at least one instance of numeric text consisting of, with the exception of whitespace characters, if any, a first number of numeric characters;
if the input text includes the at least one instance of numeric text, determining whether the first number of numeric characters is identical to a second number of numeric characters in the confidential number or is within a range of a possible number of numeric characters in the confidential number;
if the first number of numeric characters is identical to the second number of numeric characters or is within the range of the possible number of numeric characters, applying a checksum formula to a numeric value formed by the first number of numeric characters; and
if the checksum formula applied to the numeric value returns a positive result, determining that the at least one instance of numeric text includes the confidential number.

14. The system of claim 13, wherein the checksum formula is a Luhn algorithm.

15. The system of claim 13, wherein the confidential number is the credit card number; and
wherein the range of the possible number of numeric characters in the credit card number is between twelve and nineteen, inclusive.

16. The system of claim 11, wherein the analyzing includes:
determining whether the input text includes at least one instance of numeric text consisting of, with the exception of whitespace characters, if any, and hyphens, if any, a first number of numeric characters;
if the input text includes the at least one instance of numeric text, determining whether the first number of numeric characters is identical to a second number of numeric characters in the confidential number or is within a range of a possible number of numeric characters in the confidential number;
if the first number of numeric characters is identical to the second number of numeric characters or is within the range of the possible number of numeric characters, applying a checksum formula to a numeric value formed by the first number of numeric characters; and if the checksum formula applied to the numeric value returns a positive result, determining that the at least one instance of numeric text includes the confidential number.

17. A non-transitory computer readable storage medium having computer readable program code embodied therewith, the computer readable program code, executable by processing circuitry of a webpage provider to perform a method for recording input text that has been input, by a user of a client device, in an input field of a webpage, the method comprising:

provide the webpage to the client device, the client device being distinct from the webpage provider, the webpage comprising: (a) the input field, and (b) instructions executable by web-accessing software for performing, by a web session recording unit, distinct from the client device, or the webpage provider, a recording of a web browsing session between the user and a website that includes the webpage, the recording of the web browsing session including recording the input text; and wherein execution of the instructions results in:
identification of masking information in the input text, if any, by the client device, the masking information being information in the input text that is to be masked by the client device prior to the recording of the input text, the identification including:
determining whether a web element of the input field includes an attribute having an attribute value that is indicative of a presence of the masking information in the input text;
if the web element includes the attribute having the attribute value, identifying the masking information; and
if the web element does not include the attribute having the attribute value, analyzing the input text to identify the masking information, if any; and
if the masking information is identified, masking of the masking information, by the client device, prior to the recording of the input text, so that the masking information is masked in the recording of the web browsing session.

* * * * *